United States Patent [19]
Roth

[11] 3,760,096

[45] Sept. 18, 1973

[54] TELEVISION RECEIVER INCLUDING A LARGE SCREEN PROJECTION SYSTEM

[76] Inventor: Solo S. Roth, One Sherwood Ter., Yonkers, N.Y.

[22] Filed: June 26, 1972

[21] Appl. No.: 266,260

[52] U.S. Cl. ........................ 178/5.4 ES, 178/5.4 EL
[51] Int. Cl. ........................ H04n 3/08
[58] Field of Search ........................ 178/5.4 E, 5.4 ES, 178/5.4 EL, 5.4 BD, 5.4 R; 313/92 PH, 89, 90; 252/301.4 S, 301.4 R; 250/199; 350/117

[56] References Cited

UNITED STATES PATENTS

| | | | |
|---|---|---|---|
| 3,510,571 | 5/1970 | Biedermann | 178/5.4 ES |
| 3,507,984 | 4/1970 | Stavis | 178/5.4 ES |

*Primary Examiner*—Robert L. Griffin
*Assistant Examiner*—F. I. Konzem
*Attorney*—Ralph E. Bitner

[57] ABSTRACT

A large screen television receiver using a laser beam to excite discrete elements of rare earth oxides to incandescence. The discrete elements are focused onto a viewing screen which may be viewed by a large audience. A laser beam is split into three parts to show a three color image. Laser beam modulators, of any known type, are used to vary the beam intensity in accordance with the receiver signals. Synchronous moving mirrors are employed to scan the array of elements and a projector system is employed to project the received pattern onto a large screen.

10 Claims, 13 Drawing Figures

TELEVISION RECEIVER INCLUDING A LARGE SCREEN PROJECTION SYSTEM

BACKGROUND OF THE INVENTION

Laser beams have been the subject of considerable development work during the past few years because the beams contain a high density of luminous power. Several pilot models have been built but they have all used the laser beam itself as the source of light for a picture. In order to show a three color image it is then necessary to provide three laser beams, one each for the red, blue, and green. There are other disadvantages to the direct laser beam display arrangement. There is a loss of luminous persistence which is liable to produce flicker and the high intensity beam is dangerous; anyone intercepting a beam is liable to be burned severely.

The present invention uses a single laser to provide all three colors for full color reproduction. A glass mounting plate of selected thermal storage capacity adds the required persistence and the laser beam is entirely enclosed within the apparatus so that there is no possibility of its reaching any one in the audience.

One of the features of the invention is the use of an array of rare earth oxides, such as cerium or thorium oxide, coupled with a filtering system, to provide a secondary source of light which can be used to illuminate a viewing screen.

Another feature of the invention is the safety factor. No excessive voltages are required. There is no danger of x-ray radiation and no large vacuum containers which might implode. The only energy produced external to the television receiver is a beam of focused light.

Other features and additional details of the invention will be disclosed in the following description, taken in connection with the accompanying drawings.

BRIEF DESCRIPTION OF THE FIGURES

FIG. 13 is an alternate means of separating the light from the source into three equal beams by the use of fiber optics.

DESCRIPTION OF THE PREFERRED EMBODIMENTS

Figures 1, 2, 3, 4, 5, 6, 7:
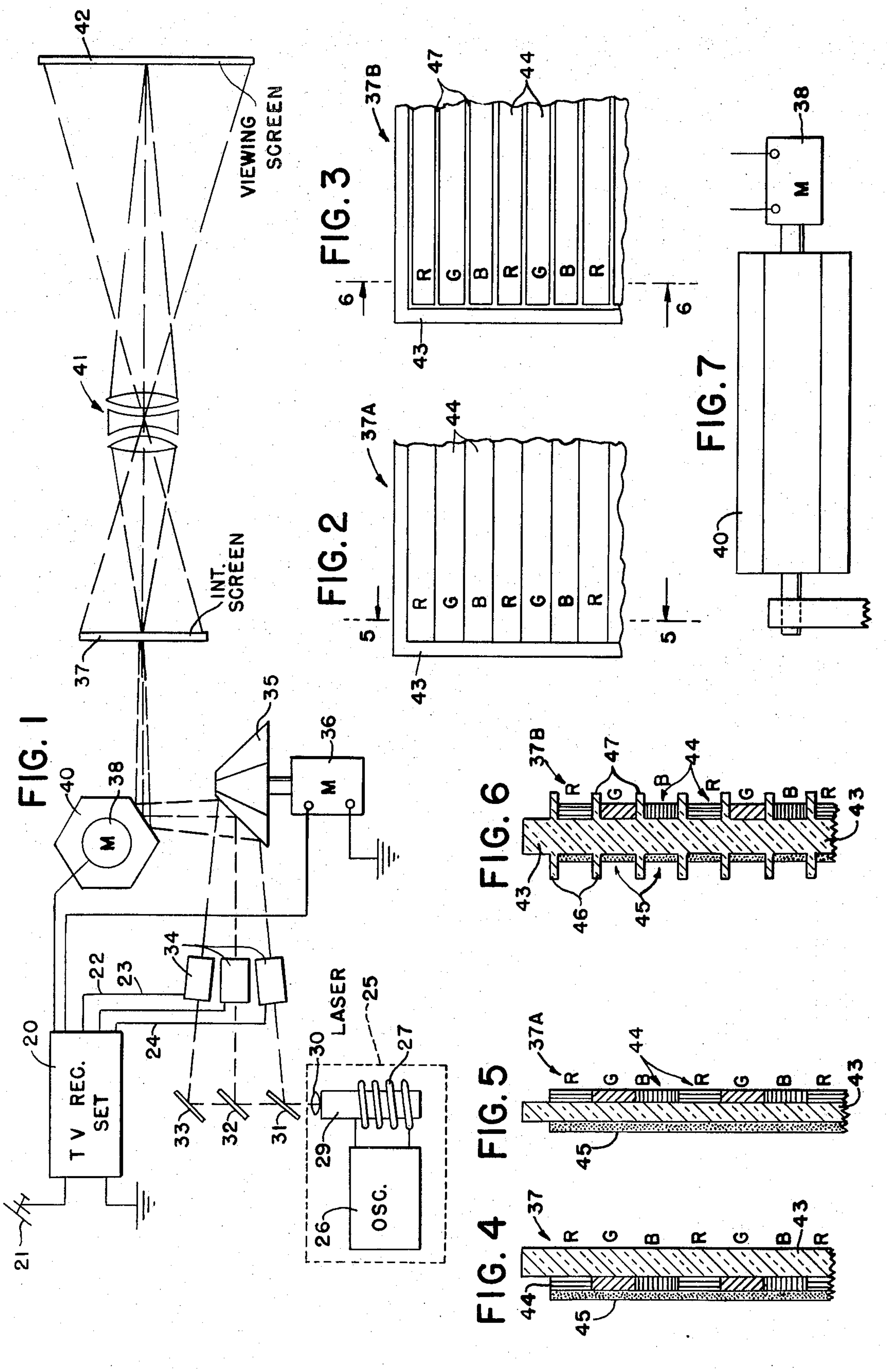
FIG. 1 is a schematic diagram of the entire receiving system with some components shown in block.
FIG. 2 is a partial plan view of the intermediate screen showing the arrangement of the oxide elements.
FIG. 3 is a plan view similar to FIG. 2 but showing an alternate arrangement of elements.
FIG. 4 is a cross sectional view of a portion of an intermediate screen, including a layer of exide material and an array of filter.
FIG. 5 is a cross sectional view of the screen shown in FIG. 2 and is taken along line 5—5 of that view.
FIG. 6 is a cross sectional view of the screen shown in FIG. 3 and is taken along line 6—6 of that view.
FIG. 7 is a front view of a rotating mirror for producing the vertical beam deflection.

Referring now to FIG. 1, the system includes a television receiving set 20, including an antenna 21, and three output conductors 22, 23, and 24, which carry the modulation information of the three primary colors, red, green, and blue. A laser light generator 25 includes an oscillator 26 for a pump tube 27 surrounding a crystal or gas tube 29. The light output from the laser is first focussed by a lens 30 and then sent to a beam splitting mirror 31 which reflects one-third of the light beam and transmits two-thirds of the light energy to the next mirror 32. The second mirror reflects one-half of the incident light and transmits one-half of the beam to a third mirror 33 which reflects all the light it receives.

Mirrors 31, 32, and 33 send their reflected beams to modulators 34 which modulate the beams in accordance with the signals received from the set 20. Modulators 34 are identical to each other and may be of several known types. A preferred modulator operates in accordance with the Pockels effect, including a single crystal of quartz between two polarizing media. Conducting electrodes are placed on opposite sides of the crystal and the modulating voltage from set 20 is applied to the electrodes. Variations of modulating voltage alter the angle of the plane of polarization and varying amounts of light are passed through the cells 34. Other modulating means are known and can be used instead of the polarizing cells 34.

In order to scan the entire intermediate screen 37, two sets of rotating mirrors are employed. The first set 35 comprises a plurality of pyramidal reflecting faces, run by a synchronous motor 36. The motor 36 is driven by pulses received from the set 20 and move the laser beams horizontally across the screen 37. A second motor 38, also run by pulses from the television set 20, turns a cylindrical set of plane mirrors 40 to provide the vertical motion of the beams. Other scanning means may be used.

The intermediate screen 37 comprises an array of small areas, each including a substance which can be raised to incandescence by the heat energy of the laser beam. Some substances, such as cerium oxide, thorium oxide, and calcium oxide, produce incandescence at lower temperatures than other materials and it is believed that photoluminescence plays a part in such an action. For the production of color, filters are added to the screen. The light generated by screen 37 is projected by a lens combination 41 and then focused to an image on a large viewing screen 42.

The intermediate screen 37 in its simplest form is shown in detail in FIG. 4 where a plane backing sheet 43 of glass or quartz is coated first with a plurality of horizontal strips 44 of red, green, and blue color filters. On top of the filter areas 44 a layer 45 of thorium oxide plus about 10 percent of cerium oxide is deposited. The laser beams are directed to scan the oxide layer in the well known line pattern, causing incandescence of the outer layer in accordance with the amount of modulation furnished by the receiver circuit.

An alternate form of screen is shown in FIG. 5 where the incandescent material 45 is deposited as a single layer on one side of the glass 43 and the filter material 44 for three color viewing is deposited on the other side in horizontal strips. The separation of the oxide layer and the filter strips 44 insures that there will be no chemical action between them and the filter strips will be maintained at a lower temperature.

FIG. 6 shows still another alternate form of screen with horizontal ribs 46 formed on the oxide side of the glass to retain strips of oxide in place and to separate the heat energy applied to each strip from its adjoining strips. On the opposite side of the glass 43 a similar array of glass ribs 47 is formed which separate and retain the filter material 44. After the filter material is applied to the screen, a roller (not shown) supplied with black dye is rolled over the color filter side of the screen, depositing a film of dye on the edges of the ribs 47, thereby preventing light from the oxide strips from leaking into the glass ribs and emerging at the rib ends to produce a series of white lines on the viewing screen 42. The black dye eliminates these lines and the focused light on the screen 42 shows only the colored parts of the picture.

Figure 8:
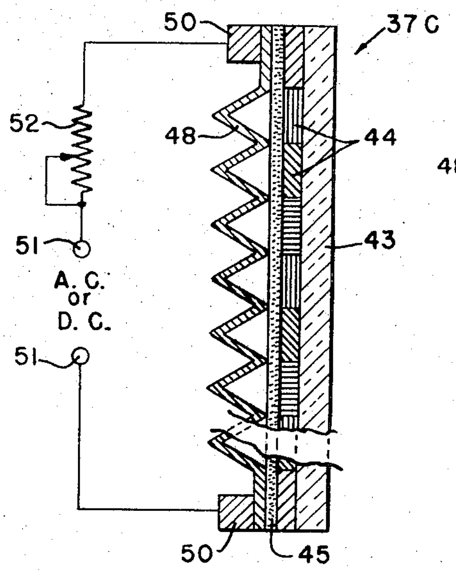
FIG. 8 is a partial cross sectional view of an intermediate screen having a heated back-up plate formed with V-shaped corrugations.
Figure 9:
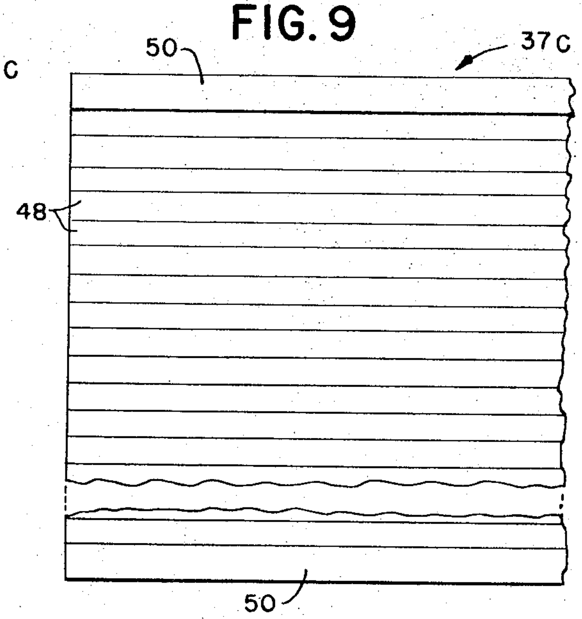
FIG. 9 is a plan view of the screen shown in FIG. 8.

Referring now to FIGS. 8 through 11, a thin corrugated metal backing sheet is added to the intermediate screen 37C to capture the heat energy of the laser beams and retain the heat energy for a longer time. A backing sheet 48 made of copper covered on both sides with black copper oxide is the preferred form of the corrugated metal but other materials can be used, such as nickel or carbon. As shown in FIG. 8, the metal backing sheet 48 is held at each side of the screen by copper electrodes 50, these electrodes being connected to a source of electric power 51, either A.C. or D.C. A variable resistor 52 is connected in series with this circuit for adjusting the flow of current so that the metal sheet is at a temperature which is just under the temperature necessary to emit light from the oxide material 45. The corrugations form triangular shaped cavities which, if coated with a black layer, form efficient radiators and direct their radiant energy toward the oxide layer 45. The metal backing plate can be added after the intermediate screen has been assembled. The glass sheet 43, the filter strips 44, and the oxide layer are the same as the screen shown in FIG. 4. While the triangular form of screen is preferred, a series of cone shaped depressions may be used instead.

Figure 10:
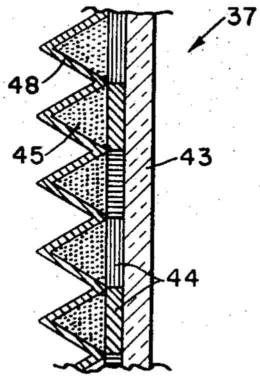
FIG. 10 is a partial cross sectional view similar to FIG. 8 but having the thorium oxide material pressed into the spaces formed by the ridges in the back-up plate.

The screen shown in FIG. 10 employs the same type of backing sheet as shown in FIG. 8, but in this alternate array, the oxide material 45 is deposited on the backing sheet, filling the corrugations on the side next to the filter strips. This form of intermediate screen has the advantage of localizing the light lines since the metal corrugations act as a shield to keep the light from one strip from shining through an adjoining filter.

Figure 11:
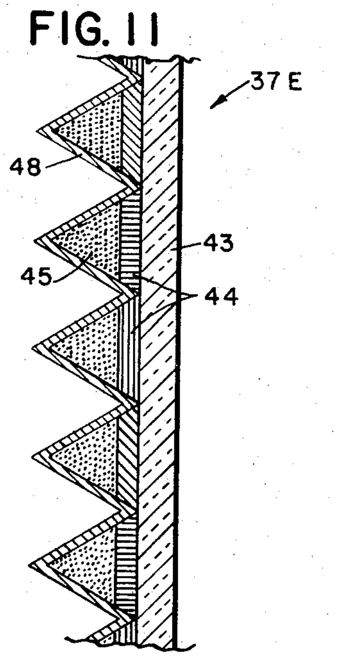
FIG. 11 is another alternate arrangement of the intermediate screen and back-up plate. In this arrangement, both the thorium oxide and the light filtering strips are contained within the corrugations.

The screen shown in FIG. 11 also uses the corrugated backing sheet 48. In this arrangement, the folds of sheet 48 are partly filled with the oxide mixture 45 and the light filtering material 44 is placed on top of the oxide to fill the fold space. This combination is then supported by a glass or quartz layer 43. The advantage of this form of screen is that all the light generated by any strip of oxide must pass through its adjoining filter. There is no possibility of any light leaks around the filter layer nor any leak to the next adjoining filter.

Figure 12:
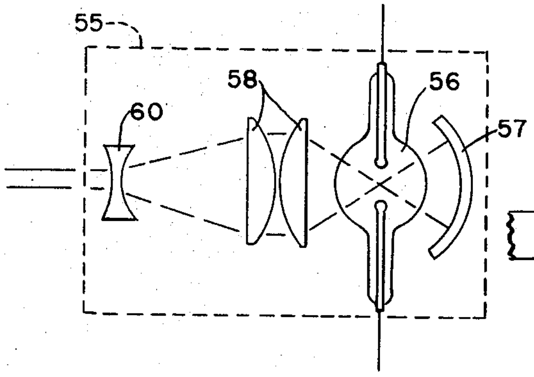
FIG. 12 is an alternate arrangement of a light source which may replace the laser.
Figure 12:
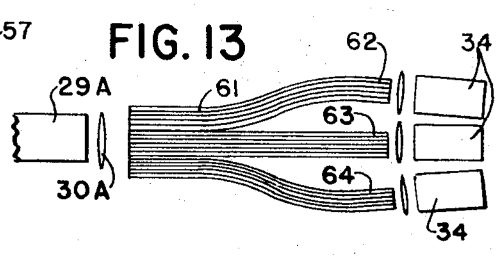

The source of light 55 shown in FIG. 12 can be substituted for the laser 25 if desired. The alternate source includes a Xenon arc lamp 56, a spherical mirror 57, a condensing lens 58, and a collimating lens 60. Any other source of light can be used as long as it supplies the required heat energy.

The three mirrors 31, 32, and 33 shown in FIG. 1 are the preferred means for splitting the laser beam into three portions. FIG. 13 shows an alternate form of beam splitter where the light from the laser crystal 29A is spread by a lens system 30A and then applied to the input end of a collection of light transmitting fibers 61. The fibers are divided into three parts 62, 63, and 64 at their exit end and the light leaving these three portions is focused and applied to the three modulators 34. This form of light splitting means has the advantage of permitting adjustment of the light energy after the structure has been put into use. Variations of light intensity can be applied to the input end of the fiber bundles by changing the relative positions of the input end and the lens 30A.

Having thus fully described the invantion, what is claimed as new and desired to be secured by Letters Patent of the United States is:

1. A large screen television receiver comprising;
a. a laser for generating a concentrated beam of light;
b. optical means for dividing the beam into three equal spaced beams;
c. modulating means positioned in the path of each beam for modulating the beam energies in accordance with a three color television signal;
d. horizontal and vertical scanning means for forming a three color pattern of a modulated television signal in a first image plane;
e. an intermediate screen positioned in the first image plane, said screen including a transparent supporting sheet, a plurality of strips of an oxide mixture which are rendered incandescent when struck by a laser beam, and a plurality of color filters positioned adjacent to the strips for filtering the light produced by the oxide mixtures;
f. optical means for focusing the light generated by the intermediate screen and projecting it to a second image plane, and
g. a viewing screen positioned in the second image plane for showing the television signal.

2. A television receiver as claimed in claim 1 wherein said optical means for dividing the laser beam into three equal beams includes three mirrors, two of which include partially reflecting coatings.

3. A television receiver as claimed in claim 1 wherein said scanning means includes two rotating mirror arrangements.

4. A television receiver as claimed in claim 1 wherein said oxide mixture contains substantially 90 percent thorium oxide and 10 percent cerium oxide.

5. A television receiver as claimed in claim 1 wherein said intermediate screen is assembled with the oxide misture positioned on one side of the transparent sheet and the filter sections positioned on the other side of the sheet.

6. A television receiver as claimed in claim 1 wherein the oxide mixture and the filter sections are positioned on the same side of the transparent sheet.

7. A television receiver as claimed in claim 1 wherein said transparent sheet is formed with horizontal ribs to separate the filter strips.

8. A television receiver as claimed in claim 1 wherein a sheet of corrugated metal is positioned adjoining the oxide mixture so as to be acted on by the laser beam.

9. A television receiver as claimed in claim 8 wherein said oxide mixture is positioned within the folds of the corrugated metal sheet.

10. A television receiver as claimed in claim 8 wherein the oxide mixture and the filter strips are both positioned within the folds of the corrugated metal sheet.

* * * * *